United States Patent [19]

Cheng et al.

[11] Patent Number: 4,574,141
[45] Date of Patent: Mar. 4, 1986

[54] METHOD FOR PRODUCING GRAFT-COPOLYMERS OF VINYL CHLORIDE AND POLYFLUORINE RESIN BY COPOLYMERIZATION

[75] Inventors: Cheng-Yi Cheng; Shou-Yuan Lee; Kwang-Ming Chen; Chee-Yuan Wo, all of Kao Hsiung City, Taiwan

[73] Assignee: Formosa Plastics Corporation, Taipei, Taiwan

[21] Appl. No.: 621,103

[22] Filed: Jun. 15, 1984

[51] Int. Cl.$^4$ ............................................ C08F 259/08
[52] U.S. Cl. .................................... 525/252; 525/253; 525/256; 525/260; 525/263; 525/276; 525/317
[58] Field of Search ............... 525/276, 317, 263, 252, 525/260, 253, 256

[56] References Cited

U.S. PATENT DOCUMENTS

| | | | |
|---|---|---|---|
| 3,956,422 | 5/1976 | Takahashi et al. | 525/317 |
| 4,006,201 | 2/1977 | Bauer et al. | 525/263 |
| 4,151,128 | 4/1979 | Ackerman | 525/263 |
| 4,230,832 | 10/1980 | Wei | 525/263 |
| 4,308,359 | 12/1981 | Büning | 525/276 |

Primary Examiner—Allan M. Lieberman
Attorney, Agent, or Firm—Burns, Doane, Swecker & Mathis

[57] ABSTRACT

This invention relates to a method for graft-copolymerizing vinyl chloride monomer to a polyfluorine resin to produce resins of improved physical properties and processability parameters. The vinyl chloride monomer and polyfluorine resin are first treated in a highly alkaline medium and at a high temperature, and the mixture is stirred. Suspension agent(s), water and an initiator are added to the mixture after the temperature thereof has been lowered. The resultant mixture which has been stirred and homogenized is heated to a temperature at which polymerization is completed. Thereafter the mixture is neutralized, washed, and dried. A product having improved impact strength and resistance to heat and abrasion results.

12 Claims, No Drawings

METHOD FOR PRODUCING GRAFT-COPOLYMERS OF VINYL CHLORIDE AND POLYFLUORINE RESIN BY COPOLYMERIZATION

BACKGROUND OF THE INVENTION

Polyvinyl chloride resin is used extensively in daily life; however, it presents many disadvantages including being relatively weak in impact strength, and having low resistance to heat and to abrasion. Polyfluorine resin, on the other hand, possesses better physical properties relative to polyvinyl chloride. Based on the observation of improved physical properties of the polyvinyl chloride when grafted with polyfluorine resin, the search has continued for a new method of graft-polymerization to produce a new material having superior physical properties. The drawbacks in the polyvinyl chloride are thus eliminated.

OBJECTS OF THE INVENTION

An object of the present invention is to develop a method for producing a material having characteristics of both polyvinyl chloride and polyfluorine resin, which is advantageous in being inexpensive to produce. Polyfluorine resin has superior processing properties; however, because of its high cost it has not been used widely. Further, this resin requires high temperature in processing, and flowability is not satisfactory. Therefore, there are many restrictions in processing of the resin. In contrast, products prepared by graft-polymerization of polyfluorine resin and vinyl chloride monomer not only possess the advantages of polyvinyl chloride, e.g., low in cost, but are, like polyfluorine resin, better in processing flowability, low in viscosity and readily processable. In addition, these specific materials possess high impact strength and resistance to chemicals, abrasion, wear, and heat, so that resorces can be used economically.

DETAILED DESCRIPTION

The present invention relates to a process for graft-copolymerization of vinyl chloride and polyfluorine resin and to the copolymers produced thereby. Accordingly, vinyl a mixture of chloride monomer and polyfluorine resin are pre-treated in a highly alkaline medium at a high temperature, and the mixture is well stirred. Suspension agent(s), water and initiator(s) are added after the temperature of the mixture has been reduced. The polymerization of the resultant mixture is carried out after it has been stirred again and become homogeneous. Thereafter, the polymerized mixture is neutralized, washed and dried, and special material having properties of both polyvinyl chloride and polyfluorine resin is formed.

It has now been found that the graft copolymers of the present invention may be prepared by a process whereby vinyl chloride monomer, polyfluorine resin, suspension agent(s) and water are mixed, stirred and homogenized, and initiator(s) are subsequently added to the mixture. It has been found that if the initiator(s) are added prior to the addition of water and suspension agent(s), some of the monomer will undergo polymerization, resulting in imperfect reaction or coagulating.

The weight proportion of polyfluorine resin to vinyl chloride monomer in accordance to the present invention is in the range of greater than 0 and up to 1 by weight. The greater the addition proportion, the better will be the physical properties of these substances.

The polyfluorine resin used in accordance to the present invention may be a polymer comprising one or several of the following: polychlorotrifluoroethylene, polytetrafluoroethylene, polyvinylfluoride, polyfluorovinylidene and hexafluoropropylenetetrafluoroethylene copolymer.

Suitable alkaline substances to be substance employed in this invention include hydroxides or oxides of alkaline or alkaline earth metals, e.g., sodium hydroxide, potassium hydroxide, lithium hydroxide, sodium oxide, calcium hydroxide, barium hydroxide, magnesium hydroxide and calcium oxide. The amount used is about 10% to 45% by weight based on the weight of the vinyl chloride monomer. The temperature of the system for pre-treatment preceding the polymerization step of the present invention is maintained at a range of 25° C. to 90° C., while the temperature at which the polymerization reaction is conducted is in the range of 25° C. to 80° C. Strict control of temperature of the system is preferred in order to maintain a precise degree of polymerization.

The agitation speed for polymerization of the present invention may be between 500 and 1000 r.p.m., and preferably is between 600 and 850 r.p.m.

Suitable initiator(s) used in the method of this invention are oil-soluble agents which contain organic peroxide and azo-compound groups and may be employed in the system in any combination; peroxides, azo-compounds, and combinations thereof are equally suitable. The amount of an initiator to be used is from 0.01% to 0.1% by weight based on the weight of the monomer vinyl chloride.

Suitable organic peroxides include lauroyl peroxide, 2,4-dichlorobenzoyl peroxide, diisopropyl peroxy dicarbonate, cumyl peroxyneodecanoate, acetyl cyclohexylsulfonyl peroxide, di-(methoxy isopropyl)-peroxydicarbonate, di-(2-ethoxyethyl)peroxydicarbonate, t-butyl peroxypivalate, stearoyl peroxide, succinic acid peroxide, and benzoyl peroxide.

Suitable azo-compounds include $\alpha\alpha'$-azo-bis-dimethyl valeronitrile, $\alpha\alpha$-azo-bis-iso-butyronitrile and 2,2'-azo-bis-2,3,3-trimethylbutyronitrile.

Suitable suspension agents of the present invention include anionic surfactants, nonionic surfactants and dispersants.

Suitable dispersants include cellulose derivatives like methyl cellulose, hydroxypropyl methyl cellulose, carboxy methyl cellulose, ethyl cellulose, hydroxyethyl cellulose and hydroxypropyl cellulose, and synthetic polymers such as polyvinyl alcohol and polyvinyl pyrrolidone, and natural polymers such as starch and gelatine.

Suitable anionic surfactants include sodium lauryl sulfate, sodium lauryl ether sulfate, sodium dodecyl benzene sulfonate, sodium alkyl benzene sulfonate, sodium hydroxyl sulfonate, sodium alkyl sulfonate, and the corresponding potassium salts, and similar compounds.

Suitable nonionic surfactants include glycerine ester of fatty acid, sorbitan ester of fatty acid, derivatives of polychloroethylene, and condensation products of fatty acids such as sorbitan monolaurate, sorbitan monopalmitate, sorbitan monostearate, sorbitan tristearate, sorbitan monooleate, sorbitan trioleate, glycerol monostearate, and glycerol monopalmitate.

The above-listed suspension agents may be used alone or in combination, with combinations being preferable. The amount of suspension agent(s) employed to obtain the desired results may be in the range of 0.10% to 1.0% by weight based on the weight of the monomer vinyl chloride.

The proportion of water to the monomer vinyl chloride in the method of this invention is 1.5 to 10% by weight, and water used must have undergone deionization treatment.

The following examples are given as specific illustrations of the invention. It should be understood, however, that the invention is not limited to the details set forth in the examples.

EXAMPLE 1

1000 cc of 45% sodium hydroxide, 1 g of cetyl alcohol and 175 g of polytetrafluoroethylene resin were placed into a 20 liter capacity, stainless-steel polymerization vessel (reactor) fitted with an agitator. The vessel was then evacuated to 700 mm Hg; thereafter, 3.5 l of vinyl chloride monomer were added to the vessel. The mixture thus prepared was stirred at 60° C. for 4 hours. The inside temperature of the vessel was then lowered to room temperature and 5 g of methyl cellulose, 6 g of polyvinyl alcohol, 6 l of deionized water, 1 g of 98% 2,2′-azo-bis-2,4-dimethyl valeronitrile and 1.4 g of 75% di-2-ethyl hexyl peroxydicarbonate were then added to the mixture. The mixture was again stirred for half an hour and inside the temperature of the vessel was raised to 58° C., at which temperature the polymerization of the mixture was conducted until the pressure drop inside the vessel reached 6 Kg/cm$^2$. At this point, the polymerization was stopped and the residual vinyl chloride monomer was recovered from the mixture. The contents of the vessel were then neutralized, washed and dried. The physical properties of the resulting graft product are set forth in Table 1 that follows the comparison Example 1.

EXAMPLE 2

1000 cc of 45% sodium hydroxide, 1 g of cetyl alcohol and 95 g of polytetrafluoroethylene resin were placed into a 20 liter capacity, stainless-steel polymerization vessel (reactor) fitted with an agitator. The vessel was then evacuated to 700 mm Hg, after which 3.5 l of vinyl chloride monomer were added to the vessel. The mixture thus prepared was stirred at 60° C. for 4 hours. The inside temperature of the vessel was next lowered to room temperature and 4.5 g of the methyl cellulose, 4.8 g of the polyvinyl alcohol and 6 l of deionized water were added to the mixture. To the mixture were then added 1 g of 98% 2,2′-azo-bis-2,4-dimethyl valeronitrile and 1.4 g of 75% di-2-ethyl hexyl peroxydicarbonate, and the mixture was stirred for half an hour. The inside temperature of the vessel was then raised to 58° C., at which temperature the polymerization of the mixture was conducted until the pressure drop inside the vessel reached 6 Kg/cm$^2$. At this point, the residual vinyl chloride monomer was recovered from the mixture. The contents of the polymerization vessel were next neutralized, washed and dried. The physical properties of the resulting graft product are set forth in Table 1 that follows the comparison Example 1.

COMPARISON EXAMPLE 1

8 l of water, 0.8 g of methyl cellulose, 2.8 g of polyvinyl alcohol, 0.4 g of cetyl alcohol, 0.8 g of 98% 2,2′-azo-bis-2,4-dimethyl valeronitrile and 1.2 g of 75% di-2-ethyl hexyl peroxydicarbonate were added to the 20 liter capacity, stainless-steel polymerization vessel fitted with an agitator. The vessel was then evacuated to 700 mm Hg, thereafter 4.5 l of vinyl chloride monomer was added to the mixture. The mixture was next stirred for half an hour. The vessel was heated to 58° C., at which temperature the polymerization of the mixture was conducted until the pressure drop of the vessel reached 6 Kg/cm$^2$. At this point, the residual vinyl chloride monomer was recovered and the contents of the polymerization were then dehydrated. The physical properties of the resulting graft product are set forth in the following Table 1.

TABLE 1

| Physical property | | Example 1 | Example 2 | Comparison Example 1 | Testing Method |
|---|---|---|---|---|---|
| Amount of Polyfluorine resin added (g) | | 175 | 95 | 0 | |
| Polymerization temperature (°C.) | | 58 | 58 | 58 | |
| Chlorine content (%) | | 54.93 | 55.54 | 56.8 | |
| Amount of plasticizer absorbed (%) | | 15.83 | 18.77 | 21.65 | |
| Bulk density (g/c.c.) | | 0.53 | 0.51 | 0.51 | |
| Specific Viscosity | | 0.316 | 0.338 | 0.354 | |
| Particle Size Distribution (%) | +42 mesh | 1.28 | 0.07 | 0.01 | |
| | +60 mesh | 2.80 | 0.15 | 0.03 | |
| | +80 mesh | 7.10 | 8.05 | 10.00 | |
| | +100 mesh | 12.95 | 15.73 | 32.00 | |
| | +150 mesh | 45.58 | 44.60 | 49.20 | |
| | +200 mesh | 22.44 | 20.78 | 7.83 | |
| | +325 mesh | 6.90 | 10.04 | 0.90 | |
| | −325 mesh | 0.95 | 0.62 | 0.03 | |
| Impact strength (Kg · cm/cm$^2$) | | 6.01 | 4.95 | 4.51 | ASTM D-256-78 |
| Resistance to solvability | | Excellent | Good | Poor | Note 1 |
| Gelation temperature (°C.) | | 140 | 149 | 160 | ASTM D-2538-79 |
| Gelation torsion (M. gr.) | | 3700 | 3550 | 2950 | ASTM D-2538-79 |
| Taber type abrasion test (abrasion wear mg/1000 rev.) | | 47 | 64 | 98 | Abrasion wheel: H-22 load 1000 g |
| Tensile strength | | 1.72 | 1.85 | 2.01 | ASTM D-638-77a |
| Elongation (%) | | 177 | 234 | 380 | ASTM D-638-77a |

EXAMPLE 3

1000 cc of 45% sodium hydroxide, 1 g of cetyl alcohol and 175 g of polytetrafluoroethylene resin were charged to a 20 liter capacity, stainless-steel polymerization vessel fitted with an agitator, with 3.5 l of vinyl chloride monomer being charged last after the vessel had been evacuated to 700 mm Hg. The mixture was then stirred for 4 hours at a temperature of 60° C. After the inside temperature of the vessel had been brought down to room temperature, 5.8 g of methyl cellulose, 7 g of polyvinyl alcohol and 6 l of deionized water were next introduced into the mixture. 3.5 g of 20% cumyl peroxy neodecanoate and 2.4 g of 75% di-2-ethyl hexyl peroxydicarbonate were charged to the mixture, which was then stirred for half an hour. The vessel was heated to a temperature of 43° C. and the polymerization of the mixture was conducted until the pressure drop of the vessel reached 5 Kg/cm². Residual vinyl chloride monomer was then recovered from the mixture and the contents of the vessel were neutralized, washed, and dried. The results obtained are shown in Table 2 that follows the Comparison Example 2.

EXAMPLE 4

1000 cc of 45% sodium hydroxide, 1 g of cetyl alcohol and 175 g of polytetrafluoroethylene resin were charged to a 20 liter capacity, stainless-steel polymerization vessel fitted with an agitator, with 3.5 l of vinyl chloride monomer being charged last after the vessel had been evacuated to 700 mm Hg. The mixture was then stirred for 4 hours at a temperature of 60° C. After the inside temperature of the vessel had been brought down to room temperature, 5.2 g of methyl cellulose, 6.5 g of polyvinyl alcohol and 6 l of deionized water were next introduced into the mixture. Two initiators, 3.5 g of 20% cumyl peroxydecanoate and 2.4 g of 75% di-2-ethyl hexyl peroxydicarbonate, were then charged to the mixture, which was stirred for half an hour. The vessel was heated to a temperature of 43° C. and polymerization of the mixture was conducted until the pressure drop inside the vessel reached 5 Kg/cm². Thereafter, residual vinyl chloride monomer was recovered from the mixture and the contents of the vessel were then neutralized, washed and dried. The results obtained are shown in Table 1 that follows the Comparison Example 2.

COMPARISON EXAMPLE 2

8 l of deionized water, 1.2 g of methyl cellulose, 3 g of polyvinyl alcohol, 0.4 g of cetyl alcohol, 3 g of 20% cumyl peroxyneodecanoate and 1.4 g of 75% di-2-ethyl hexyl peroxydicarbonate were charged to a 20 liter capacity, stainless-steel polymerization vessel fitted with an agitator. 4.5 l of vinyl chloride monomer were next charged to the vessel after it had been evacuated to 700 mm Hg. The mixture was then stirred for half an hour. Thereafter the vessel was heated to a temperature of 43° C. at which temperature polymerization of the mixture was conducted until the pressure drop inside the vessel reached 5 Kg/cm². After the residual vinyl chloride monomer had been stripped off, the contents of the vessel were dehydrated. The results obtained are set forth in the following Table 2.

NOTE 1

For the purpose of comparison, a mixture of 100 parts by weight of polyvinyl chloride resin, 2 parts of a tribasic lead sulfate, 0.8 parts of stearic acid and 40 parts of a plasticizer (DOP) was kneaded for 5 minutes on a roll. The product was then processed into a sheet and test pieces prepared therefrom were kept at 25° C. for 24 hours. Test pieces were then placed in cyclohexanone and changes associated thereof were observed.

TABLE 2

| Physical property | | Example 3 | Example 4 | Comparison Example 2 | Testing Method |
|---|---|---|---|---|---|
| Amount of Polyfluorine resin added (g) | | 175 | 95 | 0 | |
| Polymerization temperature (°C.) | | 43 | 43 | 43 | |
| Chlorine content (%) | | 54.12 | 55.04 | 56.8 | |
| Amount of plasticizer absorbed (%) | | 25.62 | 30.79 | 32.4 | |
| Bulk density (g/c.c.) | | 0.48 | 0.42 | 0.34 | |
| Specific Viscosity | | 0.490 | 0.505 | 0.530 | |
| Particle Size Distribution (%) | +42 mesh | 1.01 | 0.87 | 0.02 | |
| | +60 mesh | 12.0 | 10.38 | 1.71 | |
| | +80 mesh | 12.8 | 14.95 | 30.43 | |
| | +100 mesh | 21.71 | 29.36 | 28.74 | |
| | +150 mesh | 42.55 | 38.90 | 30.04 | |
| | +200 mesh | 9.87 | 5.03 | 7.18 | |
| | +325 mesh | 0.89 | 0.27 | 1.60 | |
| | −325 mesh | 0.04 | 0.20 | 0.29 | |
| Impact strength (Kg · cm/cm²) | | 6.98 | 6.02 | 5.74 | ASTM D-256-78 |
| Resistance to solvability | | Excellent | Good | Poor | Note 1 |
| Gelation temperature (°C.) | | 164 | 170 | 180 | ASTM D-2538-79 |
| Gelation torsion (M. gr.) | | 4100 | 3950 | 3450 | ASTM D-2538-79 |
| Taber type abrasion test (abrasion wear mg/1000 rev.) | | 37 | 57 | 72 | Abrasion wheel: H-22 Load 1000 g |
| Tension strength | | 2.05 | 2.30 | 2.54 | ASTM D-638-77a |
| Elongation (%) | | 182 | 240 | 395 | ASTM D-638-77a |

While the present invention has been described in reference to its specific embodiments, it will be apparent to those skilled in the art that various modifications can be made without departing from the spirit and scope of the invention. Accordingly, it is not intended that the invention be limited by those illustrative descriptions, except as by the appended claims.

What is claimed is:

1. A method of graft copolymerization of vinyl chloride and polyfluorine resin comprising the steps of
    (a) heating to about 90° C. vinyl chloride monomer and polyfluorine resin in an alkaline solution under stirring conditions the ratio by weight of polyfluorine to vinyl chloride being greater than 0 and up to 1;
    (b) subsequently cooling the alkaline solution to room temperature;
    (c) adding a suspension agent, diluting with water and adding an initiator;
    (d) stirring the resultant mixture to a substantially homogenized state;
    (e) heating the resultant homogenized reaction mixture to a graft copolymerization temperature to substantially complete graft copolymerization of vinyl chloride and the polyfluorine resin; and
    (f) neutralizing, washing and drying the polymerized mixture.

2. The method of claim 1, wherein the graft copolymerization is conducted under agitation at a speed range of 500 to 1,000 r.p.m.

3. The method of claim 1, wherein the graft copolymerization is conducted under agitation at a speed range of 600 to 850 r.p.m.

4. The method of claim 1, wherein the amount of suspension agent is in the range of from 0.01% to 1.0% by weight of the monomer.

5. A method of graft copolymerization of vinyl chloride and polyfluorine resin comprising the steps of
(a) heating vinyl chloride monomer and polyfluorine resin in an aqueous medium comprising (1) about 1.5 to 10% by weight of vinyl chloride monomer based on weight of water, and (2) about 10 to 45% by weight of an alkaline substance based on weight by vinyl chloride monomer, the weight proportion of polyfluorine resin to vinyl chloride monomer being in the range of approximately greater than 0 and up to 1;
(b) subsequently cooling the alkaline solution to room temperature;
(c) adding a suspension agent in an amount of about 0.10% to 1.0% based on weight of vinyl chloride monomer, diluting and adding an initiator in an amount of from 0.01% to 0.1% by weight based on vinyl chloride monomer weight;
(d) stirring the resultant mixture at an agitation speed of between 500 and 1000 r.p.m. to form a homogenized mixture;
(e) heating the resultant homogenized reaction mixture to a graft copolymerization temperature to substantially complete graft copolymerization of vinyl chloride and polyfluorine resin; and
(f) neutralizing, washing, and drying the polymerized mixture,
wherein said polyfluorine resin is selected from the group consisting of polychlorotrifluoroethylene, polyvinyl fluoride, polytetrafluoroethylene, polyfluorovinylidene and hexafluoropropylenetetrafluoroethylene copolymer.

6. The method of claim 5, wherein the alkaline substance of (a) is selected from the group consisting of hydroxides or oxides of alkaline or alkaline earth metals.

7. The method of claim 5, wherein step (a) is conducted at a temperature of about 25° C. to 90° C.

8. The method of claim 5, wherein step (c) is conducted at a temperature of about 25° C. to 80° C.

9. The method of claim 5, wherein the initiator of (a) is selected from the group consisting of organic peroxides, azo-compounds, and mixtures thereof.

10. The method of claim 9, wherein the initiator is selected from the group consisting of lauroyl peroxide, 2,4-dichloro-benzoyl peroxide, diisopropyl peroxy dicarbonate, cumyl peroxyneodecanoate, acetyl cyclohexyl-sulfonyl peroxide, di-(methoxy isopropyl)-peroxydicarbonate, di-(2-ethoxyethyl)peroxydicarbonate, t-butyl peroxypivalate, stearoyl peroxide, succinic acid peroxide, benzoyl peroxide, $\alpha,\alpha'$-azo-bis-dimethyl valeronitrile, $\alpha,\alpha'$-azo-bis-isobutyronitrile, 2,2'-azo-bis-2,3,3-trimethylbutyronitrile, and mixtures thereof.

11. The method of claim 5, wherein said suspension agent of (a) is selected from the group consisting of anionic surfactants, nonionic surfactants, dispersants, and mixtures thereof.

12. The method of claim 11, wherein said suspension agent is selected from the group consisting of alkyl derivatives of cellulose, polyvinyl alcohol, polyvinyl pyrrolidone, starch, gelatine, sodium or potassium lauryl sulfate, sodium or potassium lauryl ether sulfate, sodium or potassium dodecyl benzene sulfonate, sodium or potassium alkyl sulfonate, polychloroethylene derivatives, glycerine esters of fatty acids, sorbitan esters of fatty acids, and combinations thereof.

* * * * *

UNITED STATES PATENT AND TRADEMARK OFFICE
CERTIFICATE OF CORRECTION

PATENT NO. : 4,574,141
DATED : March 4, 1986
INVENTOR(S) : Cheng-Yi Chen et al

It is certified that error appears in the above-identified patent and that said Letters Patent is hereby corrected as shown below:

Column 1, line 46, change "vinyl a mixture of" to --a mixture of vinyl--.

Column 2, line 44, after "bα" insert --'--.

Column 3, line 8, before "by", delete --%--.

Column 7, line 9, before "by", delete --%--.

Signed and Sealed this

Twelfth Day of August 1986

[SEAL]

Attest:

Attesting Officer

DONALD J. QUIGG

Commissioner of Patents and Trademarks